US010512845B2

(12) United States Patent
Chai et al.

(10) Patent No.: US 10,512,845 B2
(45) Date of Patent: Dec. 24, 2019

(54) REAL-TIME MANIPULATION OF GAMEPLAY THROUGH SYNCHRONOUS SIGNAL CONSUMPTION IN NON-INTERACTIVE MEDIA

(71) Applicant: Disney Enterprises, Inc., Burbank, CA (US)

(72) Inventors: Nina Chai, Sunnyvale, CA (US); David Feder, San Francisco, CA (US); Thomas Dekeyser, San Carlos, CA (US); Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 547 days.

(21) Appl. No.: 15/270,628

(22) Filed: Sep. 20, 2016

(65) Prior Publication Data
US 2018/0078858 A1   Mar. 22, 2018

(51) Int. Cl.
| A63F 13/655 | (2014.01) |
| A63F 13/58 | (2014.01) |
| A63F 13/69 | (2014.01) |
| A63F 13/213 | (2014.01) |
| A63F 13/35 | (2014.01) |
| A63F 13/216 | (2014.01) |
| A63F 13/217 | (2014.01) |
| A63F 13/215 | (2014.01) |
| A63F 13/211 | (2014.01) |

(Continued)

(52) U.S. Cl.
CPC .......... *A63F 13/655* (2014.09); *A63F 13/211* (2014.09); *A63F 13/212* (2014.09); *A63F 13/213* (2014.09); *A63F 13/215* (2014.09); *A63F 13/216* (2014.09); *A63F 13/217* (2014.09); *A63F 13/35* (2014.09); *A63F 13/58* (2014.09); *A63F 13/69* (2014.09); *A63F 13/65* (2014.09); *A63F 2300/105* (2013.01); *A63F 2300/1012* (2013.01); *A63F 2300/1087* (2013.01)

(58) Field of Classification Search
CPC ...................................................... G07F 17/34
See application file for complete search history.

(56) References Cited

U.S. PATENT DOCUMENTS

2009/0149250 A1 * 6/2009 Middleton .............. A63F 13/12
   463/31
2017/0296927 A1 * 10/2017 Hodgson ............... A63F 13/245

* cited by examiner

*Primary Examiner* — Robert T Clarke, Jr.
(74) *Attorney, Agent, or Firm* — Patterson + Sheridan, LLP

(57) ABSTRACT

Systems, methods and articles of manufacture for manipulating an interactive gameplay of a mobile device in real-time based on a state of a physical environment in which the mobile device is located. Embodiments include receiving, from one or more sensor devices of the mobile device during an interactive gameplay of an application on the mobile device, data characteristic of operating conditions of the environment in which the mobile device is located. Once the application determines that data received from the sensors satisfies conditions configured on the application for each type of sensor device, embodiments determine whether to manipulate the interactive gameplay by querying a remote database for one or more gameplay effects corresponding to the data. Once a response identifying at least one gameplay effect associated with the data is received, embodiments manipulate the interactive gameplay based on the identified gameplay effect.

18 Claims, 9 Drawing Sheets

(51) Int. Cl.
*A63F 13/212* (2014.01)
*A63F 13/65* (2014.01)

REAL-TIME MANIPULATION OF GAMEPLAY THROUGH SYNCHRONOUS SIGNAL CONSUMPTION IN NON-INTERACTIVE MEDIA

BACKGROUND

Field of the Disclosure

The present disclosure generally relates to entertainment systems, and more specifically to techniques for manipulating an interactive gameplay experience in real-time based on a state of a physical environment.

Description of the Related Art

Video gaming technology has significantly progressed since the first video games were developed. Today, for example, with improvements to hardware, users can play interactive games on hand-held video games, home video games, and personal computer hardware platforms costing only a few hundred dollars. These video game systems typically include a hand-held controller, game controller or in the case of a hand-held video game platform, an integrated controller. A user interacts with the controller to send commands or other instructions to the video game system to control a video game or other simulation. For example, the controller may include a joystick and buttons operated by the user.

Further, the advent of mobile gaming has led to significant advances in hardware associated with mobile devices, which in turn has spurred the development of complex and sophisticated gaming applications for mobile devices. Such gaming applications primarily rely on inputs received from a user that is directly interacting with the mobile game to influence the gameplay experience on the mobile device. That is, a user via a direct physical input to the mobile device (e.g., such as a touchscreen of the mobile device) may specify an input to the mobile game, and in response, the mobile game may alter the gameplay experience based on the input. However, as such gameplay manipulations are triggered primarily based on user input, the gameplay experience remains largely disconnected from the environment in which the mobile device is located.

SUMMARY

One embodiment provides a non-transitory computer-readable medium containing computer program code that, when executed, performs an operation. The operation includes receiving, from one or more sensor devices of a mobile device during an interactive gameplay of an application on the mobile device, data characteristic of one or more operating conditions of an environment in which the mobile device is located. Additionally, the operation includes upon determining that data received from the one or more sensors satisfies one or more conditions configured on the application for each type of sensor device, determining whether to manipulate the interactive gameplay of the application by querying a remote database for one or more gameplay effects corresponding to the received data. The operation further includes upon receiving a response identifying at least one gameplay effect associated with the received data, manipulating the interactive gameplay of the application based on the identified at least one gameplay effect.

Another embodiment provides a system that includes a processor and a memory containing computer program code that, when executed, performs an operation. The operation includes receiving, from one or more sensor devices of a mobile device during an interactive gameplay of an application on the mobile device, data characteristic of one or more operating conditions of an environment in which the mobile device is located. Additionally, the operation includes upon determining that data received from the one or more sensors satisfies one or more conditions configured on the application for each type of sensor device, determining whether to manipulate the interactive gameplay of the application by querying a remote database for one or more gameplay effects corresponding to the received data. The operation further includes upon receiving a response identifying at least one gameplay effect associated with the received data, manipulating the interactive gameplay of the application based on the identified at least one gameplay effect.

Still another embodiment provides a method. The method includes receiving, from one or more sensor devices of a mobile device during an interactive gameplay of an application on the mobile device, data characteristic of one or more operating conditions of an environment in which the mobile device is located. The method also includes upon determining that data received from the one or more sensors satisfies one or more conditions configured on the application for each type of sensor device, determining whether to manipulate the interactive gameplay of the application by querying a remote database for one or more gameplay effects corresponding to the received data. The method further includes upon receiving a response identifying at least one gameplay effect associated with the received data, manipulating the interactive gameplay of the application based on the identified at least one gameplay effect.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of the disclosure and are therefore not to be considered limiting of its scope, for the disclosure may admit to other equally effective embodiments.

DETAILED DESCRIPTION

Figure 1:
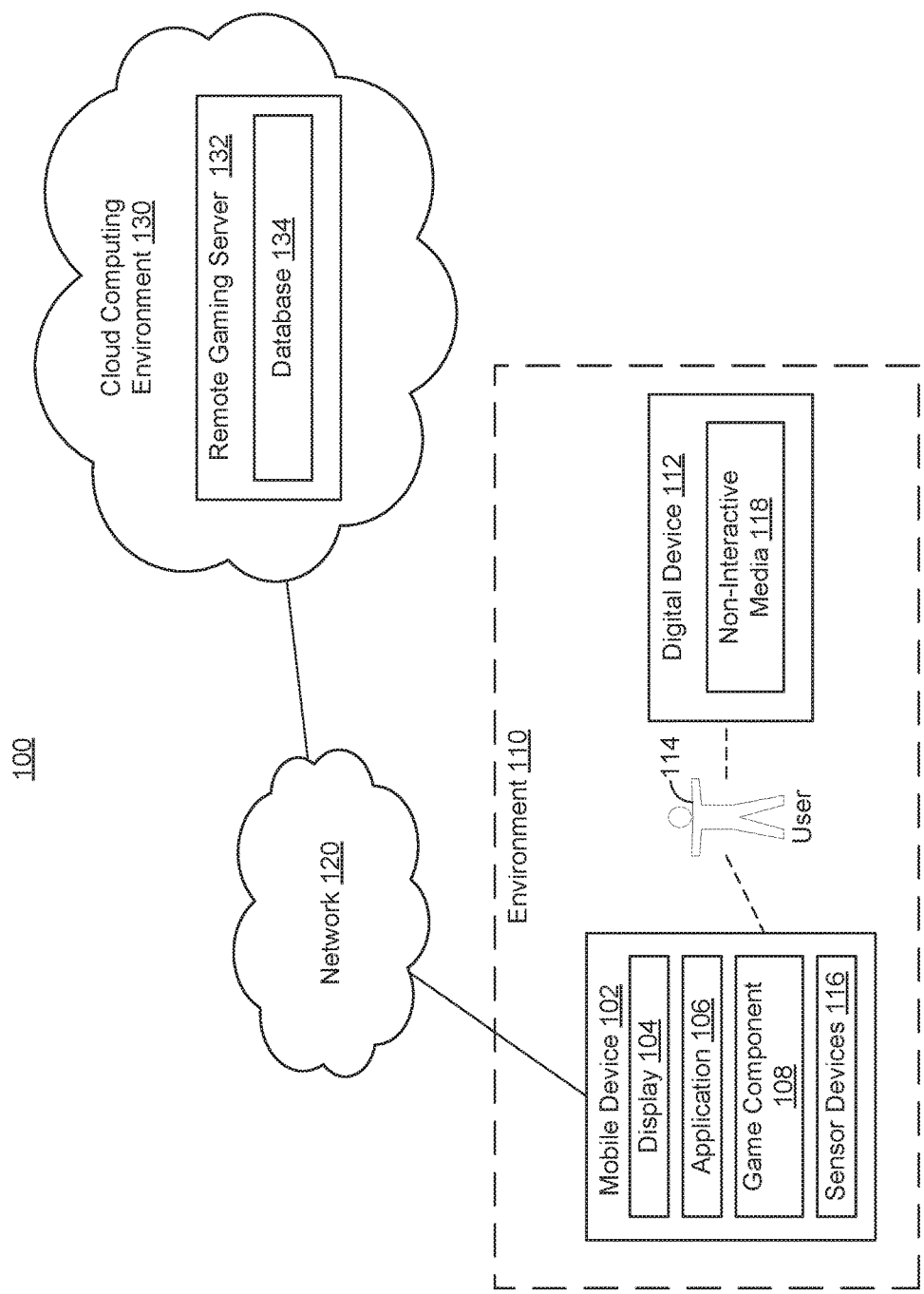
FIG. 1 is a diagram illustrating a system for manipulating gameplay of a mobile device based on a state of a physical environment, according to one embodiment described herein.

Mobile devices are generally able to obtain a staggering amount of information about the surrounding environment in which the devices are located. For example, mobile devices can include motion sensors, environmental sensors, camera sensors, microphone sensors, location sensors, communication sensors, etc., that applications can use to gain information associated with conditions in the surrounding physical environment. However, while mobile devices generally have access to such information, many mobile games primarily rely on one input source alone, e.g., direct physical input from a user, to manipulate the gameplay experience for the user. As a result, such mobile games do not fully provide an immersive gameplay experience for the user.

Further, techniques that developers use to modify mobile games based on sensor data are generally inefficient, inflexible, and labor intensive. For example, developers have to build and store specific gameplay modifications into the gaming application (e.g., as part of the development process for the gaming application). As a result, developers generally have to write new gaming applications, or updates to gameplay applications, in order to change the particular gameplay modifications, add gameplay modifications, remove gameplay modifications, etc. Further, as games continue to become more complex, building numerous gameplay modifications into a gaming application in this manner can significantly increase the size of the gaming application.

Embodiments herein provide an improved technique (e.g., relative to conventional techniques) for integrating a user's in-game experience (e.g., experience with playing a mobile game or application) with the user's out-of-game experience (e.g., what is occurring in the user's surrounding physical environment). Specifically, embodiments include systems, methods and articles of manufacture for using existing sensors in a mobile device and a remote gaming server (e.g., located in a cloud computing environment) to trigger real-time manipulation of a game, application, or other interactive experience in order to better match what is actively happening in a physical environment or on another digital device (e.g., in a film, program, or other non-interactive media).

One embodiment includes receiving, while a user is interacting with a mobile game on a mobile device, information associated with the user and/or the surrounding physical environment in which the mobile device is located. The mobile device, for example, may include one or more sensor devices, such as a microphone sensor, light sensor, location sensor, communication sensor, camera sensor, accelerometer, flash sensor (device), etc., that the mobile application may interact with to determine contextual information of the user (e.g., location of the user, user's gait and movements, etc.) and/or the surrounding environment (e.g., lighting conditions, weather in the user's location, time of day, etc.). The light sensor on the mobile device, as a reference example, can measure ambient light levels in the user's surrounding (indoor or outdoor) environment. As another reference example, the accelerometer on the mobile device can measure the acceleration of the mobile device, which the application can use to infer the user's current gait and movements.

Embodiments can configure the mobile application with one or more conditions that, when satisfied, prompt the mobile application to determine whether to modify the interactive gameplay for the mobile application based on the surrounding physical environment. The conditions configured for the application can include events within the mobile application (e.g., a current level, current character, setting, etc.), one or more predefined intervals (or times), events within the surrounding environment (e.g., determined from sensors on the mobile device), etc. Once the conditions are satisfied, the mobile application interacts with a remote gaming server to determine whether and/or how to modify the interactive gameplay based on the received sensor data. In one example, the mobile application queries at least one remote database (e.g., within the gaming server) for one or more gameplay effects corresponding to the information within the query. Such information may include data from one or more sensors on the mobile device, data regarding the current gameplay state on the mobile application (e.g., the particular level, characters being used, gameplay sequence, etc.), data regarding the user of the mobile application (e.g., how long the user has been playing the particular game, experience of the user, etc.), and the like.

Assuming the mobile device is configured with a light sensor, for example, the mobile application may submit a query for one or more gameplay lighting conditions anytime the application begins to load a new level, enter a new world (or virtual setting), use a new character, etc. In such an example, the application may include, within the query, information such as the ambient light level(s) (detected by the light sensor) for the surrounding (indoor or outdoor) environment, the current (or default) gameplay lighting in the application, and other information related to the user and/or application.

In some embodiments, the mobile application can map the data from the sensors to an attribute value associated with the interactive gameplay based on the conditions configured for the application, and include the attribute value as part of the query that the application submits to the remote database. Continuing with the light sensor as a reference example, the application may map the light levels detected by the light sensor to a value that indicates a quality of light in the environment (e.g., such as "sunny," "bright," "cloudy," etc.) based on predefined thresholds associated with the light sensor. In another reference example using an audio sensor, the mobile application may determine that sound effects in the surrounding environment (e.g., from non-interactive media source, such as a film playing on a device) correspond to one of a plurality of thematically-related films associated with the mobile application. More generally, however, a mobile application can leverage any information from the mobile device's sensors for determining whether the information satisfies conditions associated with the application.

Once the mobile application submits a query, the mobile application may receive a response from the remote database that includes one or more gameplay effects for the mobile application. The gameplay effects can include a set of states for attributes (e.g., lighting, weather, audio, etc.) that that the mobile application can modify in the interactive gameplay, intensity values (e.g., a particular ambient light level, virtual game character experience rating, etc.) for attributes, actions the mobile application can take (e.g., modifying application settings, such as level difficulty, sound volume, etc.), and the like. Continuing with the reference example of a light sensor, the mobile application can receive a list of different states for lighting conditions, such as "dark," "sunny,"

"daytime," "cloudy," etc., one or lighting intensity values (e.g., 80% in-game lighting), etc. Using another reference example of an audio sensor, the mobile application may query a remote database for gameplay effects related to an audio signature (detected by the audio sensor) from a film thematically related to the mobile application. In this example, the mobile application may receive (as part of the gameplay effects) a list of characters from the thematically related film that correspond to the particular audio signature. In this manner, the mobile application can manipulate virtual characters of the mobile application based on characters in the film that are currently shown on the non-interactive media source in the environment. In some cases, manipulating the virtual characters may include updating visual attributes (e.g., costume, facial features, etc.) of the virtual character based on the attributes of the character in the film. Of course, those of ordinary skill will understand that other attributes of the virtual character and/or mobile application can adjusted based on information returned from the remote database.

In this manner, embodiments herein use existing sensors in mobile devices to provide a more reactive digital game experience based on physical surroundings, which in turn, provides a more immersive, integrated user experience with the mobile application or game. Further, by interacting with a remote database to determine whether and/or how to modify the interactive gameplay for the mobile application (e.g., as opposed to coding and storing every possible gameplay effect on the mobile device for the application), the techniques presented herein can substantially reduce the amount of memory and/or storage required to play a given mobile application on a mobile device, and provide greater flexibility to developers designing mobile applications.

Note that, in the following description, many of the embodiments refer to particular mobile applications (e.g., Star Wars: Commander®, etc.) as reference examples of mobile applications that can be manipulated based on the physical environment state using the techniques presented herein. Note, however, that other types of mobile applications (e.g., from first-person shooter gaming applications, strategy gaming application, adventure gaming applications, etc.) can be manipulated using the techniques presented herein. Further, although many of the embodiments refer to lighting sensors and microphone sensors as reference examples of the types of sensor devices a mobile device may use to obtain information regarding the physical environment state, the techniques presented herein can also be used for other types of sensor devices, such as environmental sensors, communication sensors, location sensors, and so on.

FIG. 1 illustrates an example system 100 for manipulating the gameplay of a mobile application based, in part, on a state of the environment in which the mobile application is played, according to one embodiment. As shown, the system 100 includes a mobile device 102 connected to a remote gaming server 132 (hosted within cloud computing environment 130) via network 120. The network 120, in general, may be a wide area network (WAN), local area network (LAN), wireless LAN (WLAN), personal area network (PAN), a cellular network, etc., In a particular embodiment, the network 120 is the Internet.

As shown, user 114 interacts with mobile device 102 in the environment 110. Environment 110 can represent an indoor environment (e.g., home environment, or other physical building) or outdoor environment (e.g., recreational park, national park, amusement/theme park, etc.). Mobile device 102 is included to be representative of a variety of computing devices, such as smartphones, tablets, portable gaming devices, and the like. Mobile device includes a display 104, applications 106, game component 108 and sensor devices 116. Applications 106 executing on the mobile device may include one or more interactive mobile gaming applications that a user may interact with via display 104. Display 104, for example, may include a touchscreen or other user interface that allows user 114 to control features of application 106.

As mentioned above, rather than relying solely on input received from user 114 via display 104, embodiments described herein can manipulate attributes of a gameplay associated with application 106 based on the user's surrounding physical environment. For example, the game component 108 is generally configured to manipulate one or more attributes of a current gameplay for application 106 in real-time based, in part, on conditions in the environment 110. To detect what is occurring in the environment 110, the game component 108 is configured to interact with sensor devices 116. A variety of different sensors can be used to detect what is occurring in the user's surrounding environment. Examples include, without limitation, a light (or luminosity) sensor, microphone sensor, location sensor (e.g., global positioning system (GPS) sensor), camera sensor, communication sensor (e.g., Bluetooth sensor), temperature sensor, accelerometer, and so on. Using sensor devices 116, the game component 108 can determine the level of lighting around the mobile device 102 (e.g., using a light sensor), location of the user, weather at the user's location (e.g., based on location sensor), user's movements and the like. In some embodiments, the game component 108 can also detect what is occurring on another device in the environment 110. For example, as shown, while user 114 is interacting with mobile device 102, the user 114 can also be consuming non-interactive media 118 (e.g., watching a film, program, etc.) on digital device 112 in the environment 110. In such a situation, the game component 108 can use the microphone sensor on the mobile device 102 to detect audio from the non-interactive media 118 (e.g., a movie playing) on the digital device 112.

While the mobile device 102 executes application 106, the game component 108 can use or more conditions configured for the application 106 for determining whether to modify the interactive gameplay on the application 106 based on what is occurring in environment 110. For example, the game component 108 can use the conditions to interact with a remote gaming server 132 (e.g., in cloud computing environment 130) to determine which attributes of the interactive gameplay can be manipulated and the manner in which the attributes can be manipulated based on sensor data. In some cases, the conditions configured for the application 106 may prompt the game component 108 to interact with the remote gaming server 132 based on one or more defined events within the application 106. Examples of such events can include, but are not limited to, particular sequences within the gameplay of the application (e.g., a particular fighting sequence, racing sequence, etc.), particular level for the gaming application, new virtual setting (or virtual world) encountered within the gameplay. In some cases, the conditions configured for application 106 can prompt the game component 108 to periodically (or at defined intervals) interact with the remote gaming server 132. For example, in cases where the interactive gameplay for the application 106 is dynamic (e.g., frequently changing), the game component 108 can be configured to query the remote gaming server 132 more often for gameplay effects relative to another application with a static virtual setting.

In some embodiments, the conditions configured for application 106 can prompt the game component 108 to interact with the remote gaming server 132 based on events in the environment 110. For example, the application 106 may be configured with one or more defined threshold values for each type of sensor device that the mobile application can use to evaluate data from each sensor. Assuming a mobile device is configured with a light sensor and/or audio sensor, the mobile application may query a remote database 134 for gameplay effects corresponding to ambient light levels that satisfy a predetermined threshold associated with the light sensor and/or audio that satisfies a predetermined threshold associated with the audio sensor. Further, the threshold values associated with each sensor 116 may be different based on the type of mobile application 106. In other words, a first-person shooter mobile gaming application may have different thresholds for each of the respective sensors compared to a mobile strategy gaming application. More generally, how often the game component 108 interacts with the remote gaming server 132 may be based on complexity of the interactive gameplay for the application 106, level of activity in the environment 110, user 114 information and/or input, etc.

Once prompted to interact with the remote gaming server 132, the game component 108 submits a query to database 134 that includes data from sensor devices 116, and other information associated with the application 106 (e.g., game state information) and/or user 114 (e.g., user information). In one embodiment, the game component 108 can submit a query for each sensor device 116. In one embodiment, the game component 108 can submit a query for a set of sensor devices 116 (or all sensor devices 116).

In some embodiments, while the mobile device 102 is continually receiving raw sensor data characterizing conditions in the environment (e.g., such as lighting level, temperature, weather, etc.), the game component 108 can evaluate the received data from each sensor using the thresholds configured for the application 106 for each sensor type, and use the thresholds to map the sensor data to one of several predefined attribute values for the sensor. The game component 108 can then include the mapped attribute value as part of the query that the game component 108 submits to the database 134 (e.g., as opposed to the raw sensor data values).

Continuing with the light sensor reference example, the application 106 may have several predefined attribute values to indicate the quality of light (e.g., such as "sunny," "bright," "dark," etc.), where each attribute value corresponds to a lighting level threshold. The game component 108 can map sensor data received from the light sensor to one of the several predefined attribute values associated with the application 106 based on the lighting level thresholds configured for the application. In one example, the game component 108 may map sensor data from the light sensor that is above a defined lighting level threshold for the application to an attribute value "lighting_level_sunny."

Referring to another reference example with a microphone sensor, the application 106 may have several predefined audio signatures (e.g., attribute values) corresponding to different songs, movies, plays, and the like, associated with the application 106. If, for example, the application 106 is a Star Wars: Commander® mobile application, the application 106 may be configured with audio signatures from different Star Wars® films. In this example, once the game component 108 receives audio data from the microphone sensor (e.g., from non-interactive media 118), the game component 108 can compare the audio data to one of the predetermined audio signatures to determine if the user 114 is watching a film associated with the application 106.

In another reference example with a camera sensor, the application 106 may be configured with several images of physical locations (e.g., attribute values) associated with the application 106. If, for example, the application 106 is one of several Disney® mobile applications, the application 106 may be configured with several images of different physical locations in Disney® theme parks. In such a case, if the game component 108 receives an image of a particular location (e.g., taken by the user 114 with the mobile device's camera sensor) in the user's environment, the game component 108 can compare images to determine if the user is currently at a physical location associated with the application 106. More generally, the game component 108 can trigger interaction with a remote gaming sever for real-time manipulation based on information from any of the mobile device's sensors that satisfies conditions configured for the application 106.

The game component 108 is generally configured to query the database 134 for any in-game manipulations corresponding to data received from the sensors. In one embodiment, the database 134 may be implemented using a key-value pair. For example, the database 134 may include a set of predefined key-value pairs (pairs of keys and associated values, or pairs of keys or index values and associated pointers other resource objects) for each of the mobile device's sensors, where the key is the attribute value for the respective sensor and the value is the set of gameplay effects corresponding to the attribute value. In some embodiments, in response to a query from game component 108, the database 134 may return a response identifying features and/or content of the application 106 that can be manipulated based on the sensor data. Examples of such content include, without limitation, playable virtual characters, virtual objects, abilities of the user's virtual character, visual effects (e.g., lighting, weather, scenery, etc.) of the virtual gameplay, gameplay settings for the application (e.g., such as mission difficulty, sound volume, font size, etc.), and so on. Moreover, although FIG. 1 illustrates a single database 134 located on server 132, one or more databases 134 may be distributed across multiple servers 132 or computing devices located in a data center or cloud environment. Advantageously, embodiments presented herein allow mobile gaming applications to leverage what is occurring around the user interacting with the mobile application and dynamically change a user's game state in order to provide a more immersive experience for the user.

Figure 2:
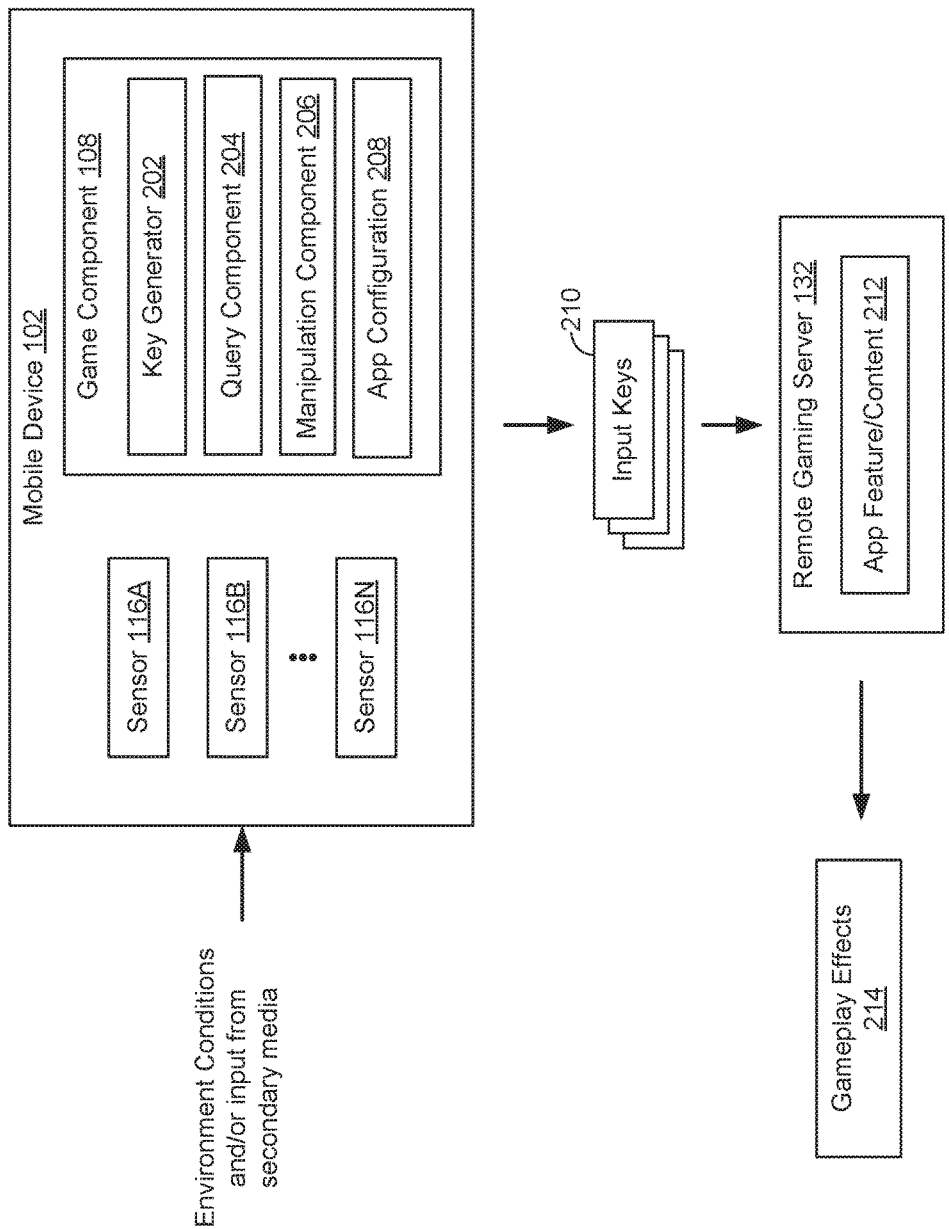
FIG. 2 is a diagram illustrating components of a system for manipulating gameplay of a mobile device, according to one embodiment described herein.

FIG. 2 is a block diagram further illustrating components of the system 100, according to one embodiment. More specifically, FIG. 2 illustrates components of the game component 108 interacting with a remote gaming server 132 to manipulate an interactive gameplay of an application. As shown, the game component 108 includes a key generator 202, query component 204, manipulation component 206, and application configuration 208. The key generator 202 is generally configured to evaluate data received from sensors 116A-N using application configuration 208. In one embodiment, the application configuration 208 includes threshold values for each type of sensor device 116 on the mobile device 102. In one embodiment, in addition to thresholds, the application configuration 208 can include attribute values associated with each application on the mobile device 102.

In one embodiment, the key generator 202 can map the data received from each of the sensors 116 to one of several predefined attribute values associated with the application 106 based on the application configuration 208. In one example, if one of the sensors 116 is a microphone sensor (or audio sensor), the predefined attribute values may correspond to different audio signatures for films, songs, videos, etc., associated with the application 106. In another example, if one of the sensors 116 is a lighting sensor (or luminosity sensor), the predefined attribute values may indicate different qualities of lighting levels. In yet another example, if one of the sensors 116 is a camera sensor, the predefined attribute values may correspond to different images of physical locations associated with the application 106. In one embodiment, the sensor data that is mapped to a predefined attribute value may correspond to one of a plurality of input keys 210 (e.g., associated with a predefined key-value pair).

The query component 204 is generally configured to query the remote gaming server 132 for one or more gameplay effects (corresponding to data received from sensors 116). In one embodiment, the query component 204 may use conditions in application configuration 208 to determine when to submit queries to the remote gaming server 132. For example, as noted above, such conditions include different events within the interactive gameplay for the application 106, defined time intervals, different events within the environment 110, etc. Once the conditions are satisfied, the query component 204 generates a query that includes data from one or more sensors. In one embodiment, the query component 204 can include input keys 210 as part of the query that is submitted to the remote gaming server 132.

In addition to the sensor data, the query component 204 can include information regarding the current gameplay state on the mobile application, user information, etc. The current gameplay state may include information, such as the current level being played in the application, the character's being used in the application, particular sequences (e.g., fighting sequence, racing sequence, etc.) in the application, and other information related to state of the interactive gameplay for application 106. The user information may include metadata such as the user's personal information (e.g., name, age, etc.), the user's experience level with the application 106, and the like.

In one embodiment, once a query is received, the remote gaming server 132 can use the game state information, user information, and sensor data within the query to identify one or more gameplay effects corresponding to the information. As shown in FIG. 2, assuming the remote gaming server 132 identifies features and/or content 212 corresponding to the input keys 210, the remote gaming server 132 returns a set of gameplay effects including the content 212 to the game component 108. In one example, if the input key 210 indicates a quality of lighting level in the environment (e.g., such as "bright," "dark," etc.), the set of gameplay effects 214 may include one or more in-game lighting conditions for application 106 that correspond to the indicated lighting level quality. In another example, if the input key 210 indicates particular audio signature from a film associated with the application 106, the set of gameplay effects may include the film characters associated with the particular audio signature. In yet another example, if the input key 210 indicates a particular image of a particular physical location associated with the application 106, the set of gameplay effects may include one or more virtual objects associated with the gameplay of the application 106. Of course, those of ordinary skill in the art will recognize that the set of gameplay effects returned to the game component 108 may include other application content and/or features.

Once gameplay effects 214 are received, the game component 108 is configured to use manipulation component 206 to modify attributes of the gameplay for application 106 based on the gameplay effects. In some embodiments, the manipulation component 206 may alter attributes of the application's interactive gameplay based on the gameplay effects to match what is occurring in the physical environment. In this manner, embodiments can integrate the user's experience within the interactive mobile application with what the user is experiencing in the surrounding physical environment to provide a more immersive gaming experience for the application. Further, by using a database to provide gameplay effects, embodiments allow mobile applications to manipulate a gaming application based on events in the surrounding that may not have been foreseeable at the time the application was designed. As such, the techniques presented herein provide greater flexibility (e.g., compared to conventional techniques) in that developers do not have to design a new application to allow the application to account for different physical events.

Figure 3A:
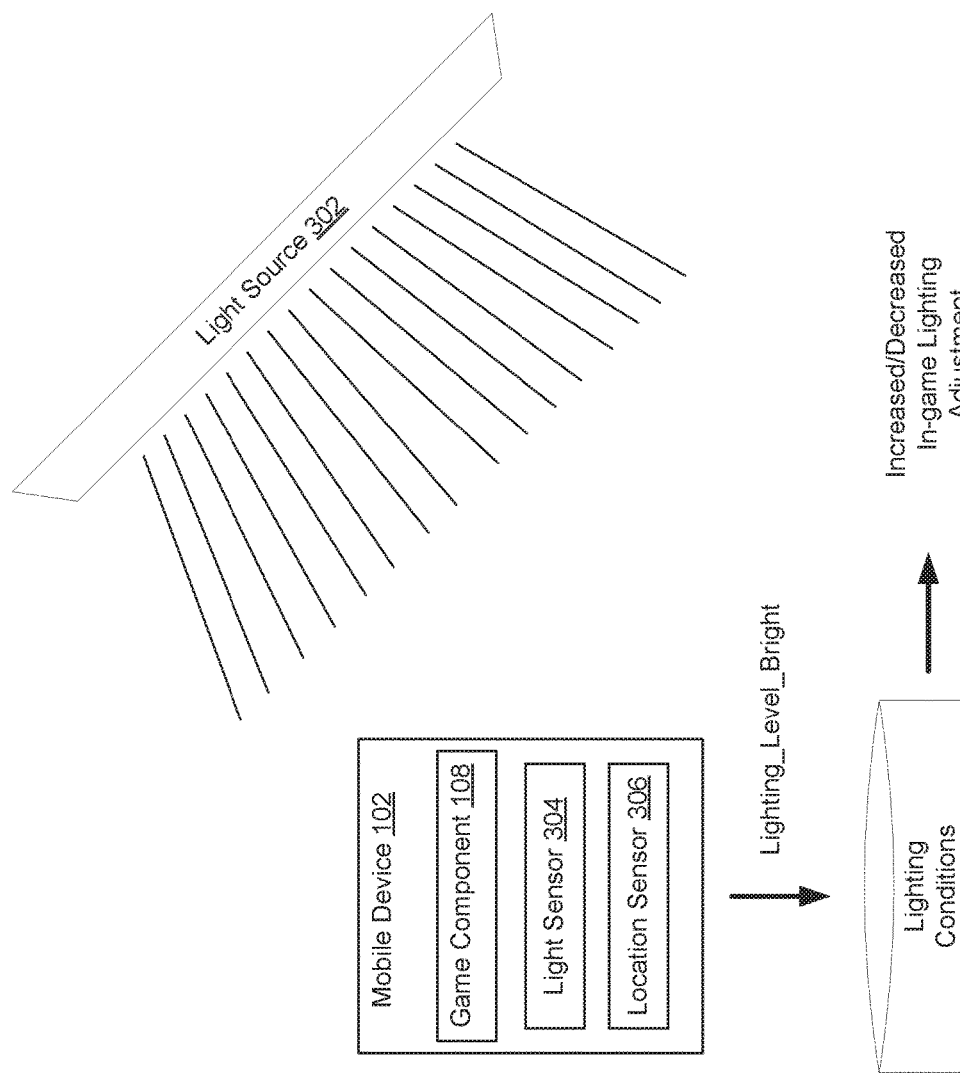
FIGS. 3A-3C illustrate example scenarios of a game component manipulating the interactive gameplay of a mobile application based on a physical environment state, according to one embodiment described herein.
Figure 3B:
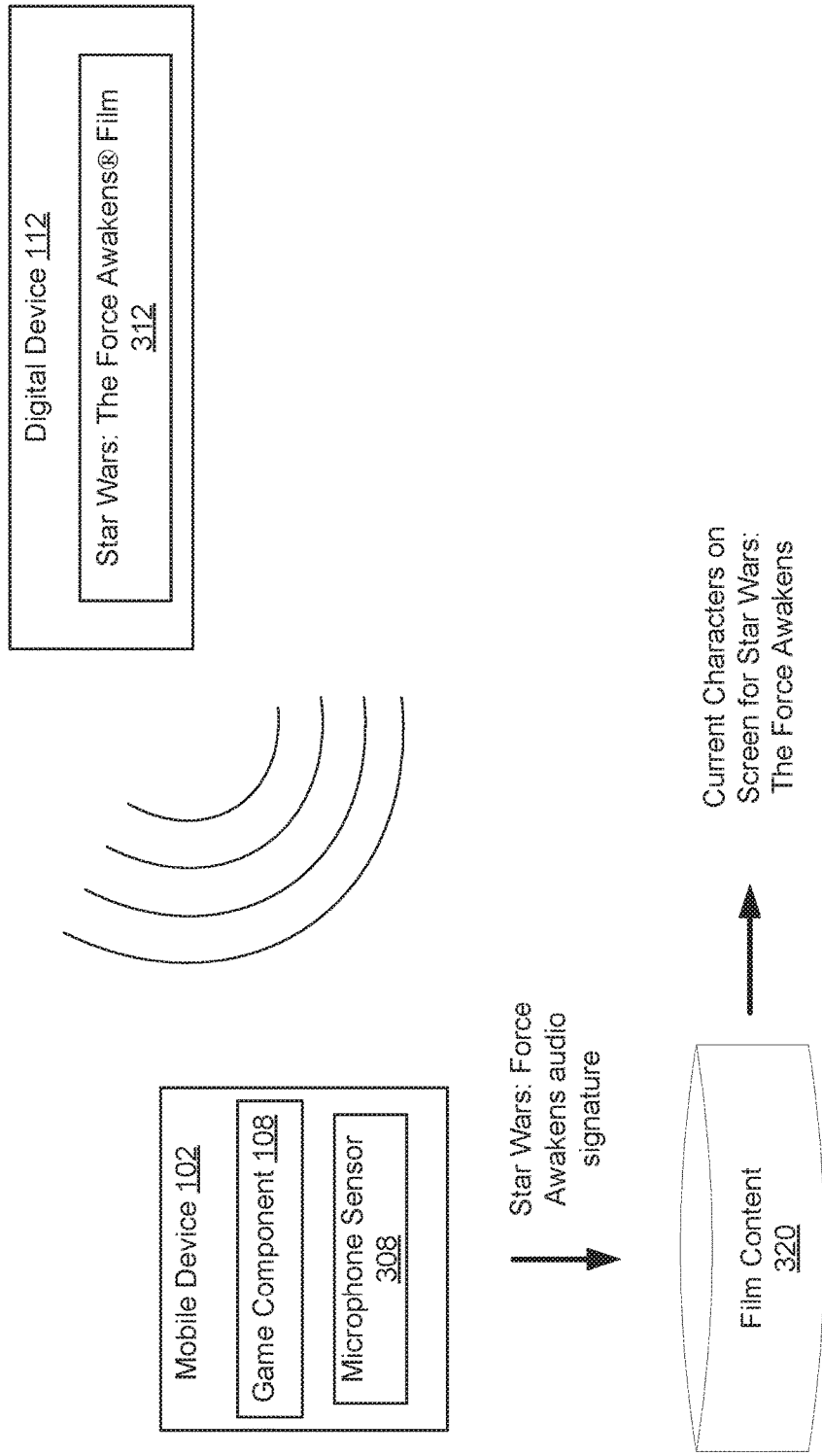
Figure 3C:
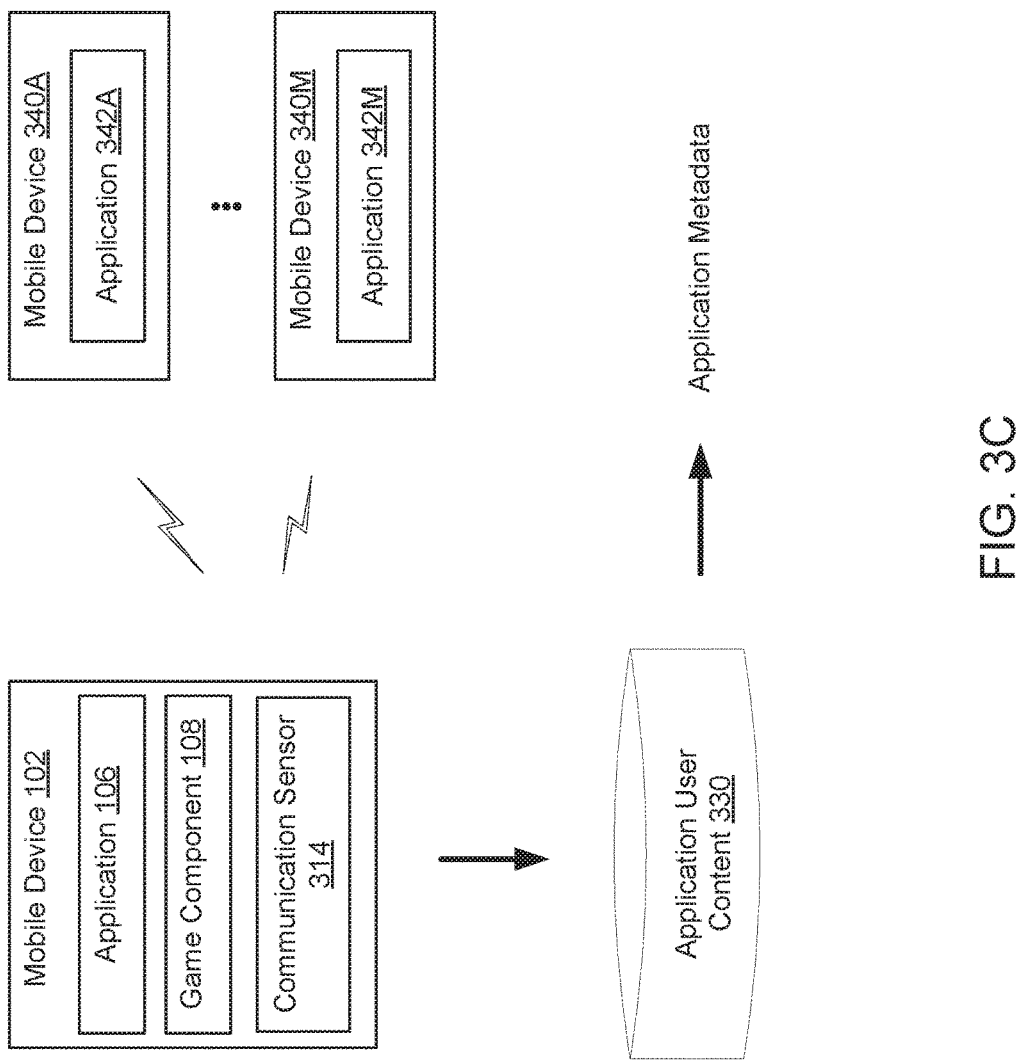

FIGS. 3A-3C illustrate examples of different scenarios where a mobile device's game component manipulating the interactive gameplay of a mobile application, based on the physical environment state, according to embodiments herein. Note that the scenarios depicted in FIGS. 3A-3C are provided merely to show reference examples of the type of conditions that can be detected in the environment using sensors of the mobile device and how the interactive gameplay can be manipulated based on the detected conditions. Those of ordinary skill in the art, however, will recognize that other environmental conditions and/or input from secondary media in the environment can be detected and that the interactive gameplay may be manipulated in other ways.

Referring first to FIG. 3A, as shown in this embodiment, the mobile device 102 includes a light sensor 304 and location sensor 306. In this example, the gaming application may be configured with one or more pre-defined in-game lighting states (e.g., "sunny," "nighttime," etc.) to use for different events within the application. That is, the in-game lighting for a virtual world within the interactive gameplay may default to "sunny" in some situations, to "nighttime" in other situations, and so on. Assuming a user is interacting with a gaming application on mobile device 102 in an (indoor or outdoor) environment with light source 302, the game component 108 can update the in-game lighting within the interactive gameplay of the application (e.g., from the default condition) based on the level of light detected by the light sensor 304. For example, once the game component 108 submits a query to database 310, the game component 108 can receive one or more in-game lighting conditions corresponding to the lighting level detected in the surrounding physical environment (e.g., "bright," "daytime," etc.). In turn, the game component 108 can choose to modify the default in-game lighting for the interactive gameplay based on the in-game lighting conditions received from the database 310.

As shown in this particular embodiment, the game component 108 can map data from the light sensor 304 that is above a predefined lighting level threshold to an attribute value that indicates the quality of light in the environment (e.g., "Lighting_Level_Bright"). In such an example, the game component 108 can query a database containing lighting conditions 134 with the attribute value "Lighting_Level_Bright" to identify at least one in-gaming lighting condition corresponding to "Lighting_Level_Bright." Based on the response from the database, the game component 108 can adjust (e.g., increase/decrease) in real-time the in-game lighting of the application's interactive gameplay. For example, if the response returns an in-game lighting condition "daytime" based on the "Lighting_Level_Bright" attribute value, the game component 108 can modify the in-game lighting condition for the interactive gameplay to "daytime" (e.g., from a default "nighttime" lighting condition). In some embodiments, instead of a lighting condition, the response from the database can return a specific lighting intensity value (e.g., lighting intensity=80 out of 100) to the game component 108. In such a case, the game component 108 can set the in-game lighting for the interactive gameplay of the application to the lighting intensity value.

Additionally or alternatively, while a user interacts with the mobile device in a particular environment, the game component 108 can use the location sensor 306 to determine the user's current position (e.g., geographical coordinates) and query information such as current weather, time of day, etc. Based on such information, the game component 108 can alter one or more in-game visual effects to match what the user is experiencing externally in the environment. For example, if it is raining at the user's current location, the game component 108 can simulate a rainy virtual environment in the mobile application. Similarly, if it is windy at the user's current location, the game component 108 can simulate a windy virtual environment in the mobile application. In this manner, the techniques presented herein provide a flexible approach for using existing sensors on a mobile device to dynamically alter in real-time the interactive gameplay on an application (e.g., in order to match the surrounding physical environment).

Referring to FIG. 3B, the mobile device 102 includes (e.g., in addition to one or more other sensors) a microphone sensor 308. Assuming the user is interacting with an application (e.g., Star Wars: Commander® mobile application) on the mobile device 102 while watching Star Wars: The Force Awakens® 312 on digital device 112, the game component 108 can update a current virtual game character of the application based on the characters in the Star Wars® film currently on screen of the digital device 112. In such an example, the microphone sensor 308 can detect audio from the digital device 112 and the game component 108 can determine the user is watching a Star Wars® film (e.g., based on predefined audio signatures corresponding to different Star Wars® films). Once determined, the game component 108 can query a database containing film content 320 with the audio data from the microphone sensor 308 as an input and receive a response identifying which characters in Star Wars: The Force Awakens® 312 are currently on screen of the digital device 112. Based on such information, the game component 108 can determine whether to modify attributes of current game character in the Star Wars: Commander® application. If, for example, the user is playing Star Wars: Commander® with the "Han Solo" character, and the database identifies "Han Solo" as one of the characters currently on screen on the digital device 112, the game component 108 can modify attributes (e.g., costume, facial appearance, abilities, power, etc.) of the "Han Solo" character in the Star Wars: Commander® mobile application in real-time based on the "Han Solo" character on screen.

Referring to FIG. 3C, the mobile device 102 includes a communication sensor 314. In one embodiment, the communication sensor is a Bluetooth sensor, which can be used to determine proximity of one or more other devices to the mobile device 102. In this embodiment, if a user interacts with application 106 on the mobile device 102 in the same environment that one or more other users interact with applications 342A-342M on mobile devices 340A-340M, the game component 108 can manipulate the interactive gameplay on the application 106 based on how applications 342A-342M are being used by other users in the environment. For example, if the user is playing a game using a particular virtual character, the communication sensor 314 can detect one or more nearby users that are playing the same application or similar application. The game component 108, in turn, can query a database containing application user content 330 for information (e.g., such as which characters are being used on the applications 342A-M, user profile settings, etc.) on the identified users. Based on the information, the game component 108 can modify attributes of virtual characters in the application 106 based on the user profile information from mobile devices 340A-M. For example, the game component 108 can alter capabilities of the virtual characters, by providing power-ups or other enhancements.

In some embodiments (not shown), the mobile device can also include various other sensors, such as a camera sensor, flash device, accelerometer, etc. In some cases, a user playing a mobile gaming application may use the mobile device's camera to unlock or acquire a new feature on the mobile application. For example, if the user is playing Star Wars: Commander®, the user can unlock or acquire a new building by pointing their camera at a specific object or location. In such an example, the game component 108 can determine if the particular object or location is associated with Star Wars: Commander® by comparing the image of the object or location to one of several images of objects and locations associated with the gaming application, and if so, query a database for information on the particular object or location. For example, if the image is of a building in Disneyland®, the game component 108 can query a database for parameters associated with the building and provide the user with one or more virtual objects associated with the physical building (e.g., such as in-game rewards or other content).

Alternatively or additionally, in some embodiments, the game component 108 can use the camera sensor and flash device to determine the physiological response of the user to an application's interactive gameplay, and adjust, in real-time, game settings of an application's interactive gameplay based on the user's physiological response. If a user, for example, while playing a mobile gaming application holds a finger over the camera and flash sensors on the mobile device, the camera and flash sensors can measure the user's heart rate. The game component 108, in turn, can infer a level of physiological response to the application's interactive gameplay based on conditions configured for the application, and can alter the user's gameplay experience by modifying one or more gameplay settings of the application in real-time based on the user's physiological response.

Additionally or alternatively, in some embodiments, the game component 108 can use the accelerometer to determine attributes of the user interacting with the mobile device, and adjust application settings of an application's interactive gameplay based on the determined user attributes. For example, the game component 108 can use the accelerometer to measure the user's gait and movements, and query a database for one or more user attributes (e.g., such as age) corresponding to the measured movements. Based on such information, the game component 108 can infer the age of the user without explicitly asking for the user's age. The game component, in turn, can use such information to manipulate application settings, such as mission difficulty, sound volume, font size, etc., based on who is using the mobile device at the current time.

Note, however, that the above applications are provided merely as reference examples of the types of applications and the content of those applications that can be manipulated in real-time based on sensor data characterizing what is occurring in the physical environment. More generally, those skilled in the art will recognize that a mobile device may include other types of mobile applications and/or sensor devices. Further, those of ordinary skill in the art will recognize that the techniques presented herein also allow for other features or aspects of the applications to be manipulated based on the sensor data.

Figure 4:
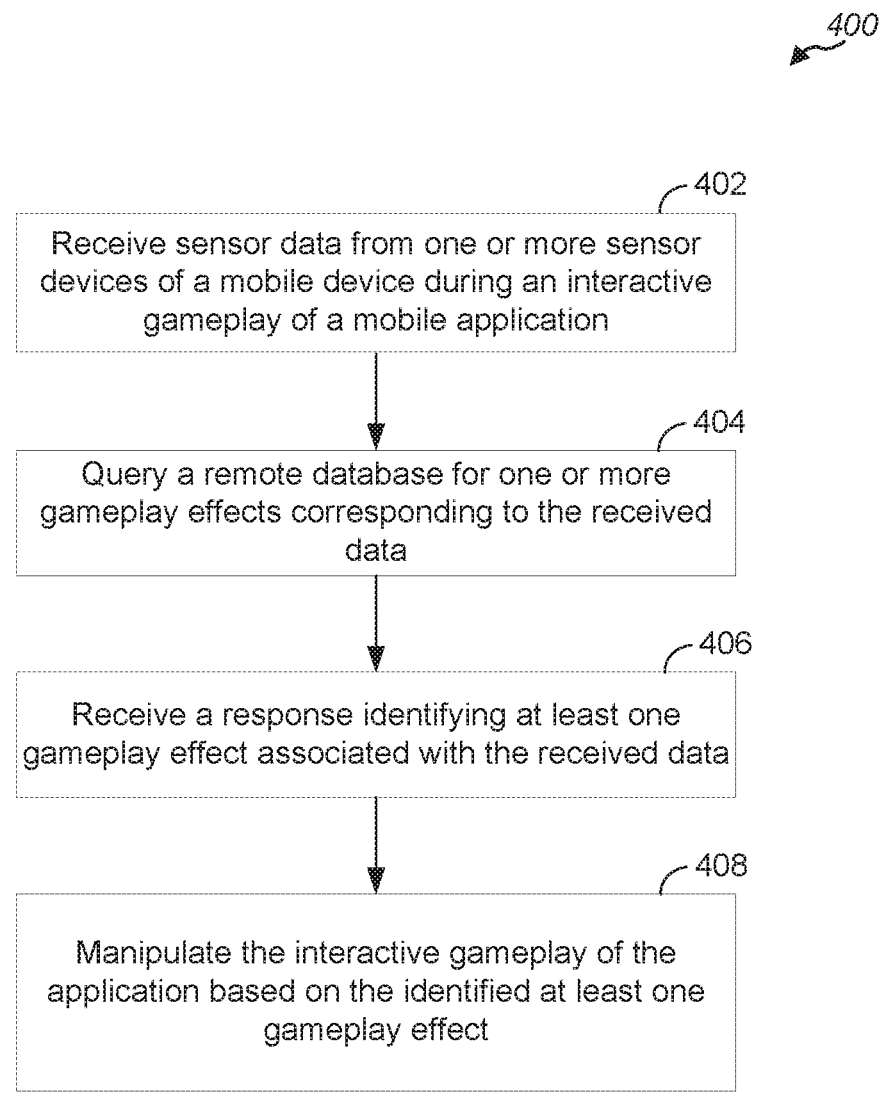
FIG. 4 is a flow diagram illustrating a method for manipulating an interactive gameplay of an application on a mobile device, according to one embodiment described herein.

FIG. 4 is a flow diagram illustrating a method 400 for manipulating an interactive gameplay of an application on a mobile device based on a state of a physical environment, according to one embodiment. As shown, the method 400 begins at block 402, where a game component 108 receives sensor data from one or more sensor devices of a mobile device during an interactive gameplay of a mobile application. As noted above, such sensor devices can include, without limitation, a location sensor, camera sensor, flash sensor, microphone sensor, light sensor, accelerometer, and so on. The data received from each sensor may characterize one or more operating conditions of an environment in which the mobile device is located. For example, the mobile device can be located in an indoor environment (e.g., such as a gaming room, residential building, commercial building, etc.) or in an outdoor environment (e.g., such as in an amusement park, recreational park, etc.).

At block 404, the game component 108 queries a remote database for one or more gameplay effects corresponding to the received data. As noted above, the game component 108 may query the database upon determining the occurrence of one or more conditions, which can include events occurring in the application 106, events in the physical environment, defined times, etc. At block 406, the game component 108 receives a response identifying at least one gameplay effect associated with the received data. As noted above, such gameplay effects can include different application features and/or content that the gameplay component can use when manipulating the interactive gameplay. At block 408, the game component 108 manipulates the interactive gameplay of the application based on the identified at least one gameplay effect.

Figure 5:
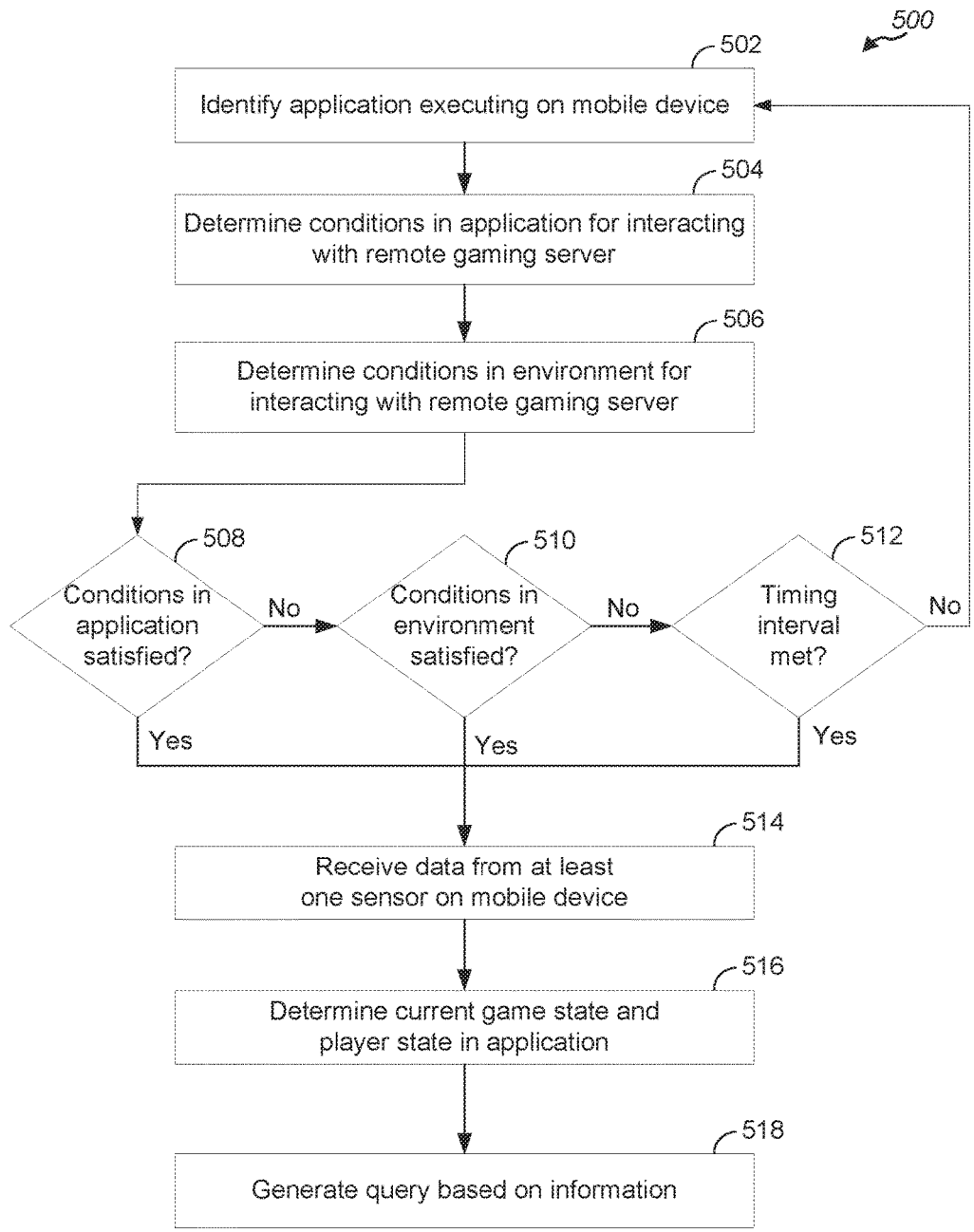
FIG. 5 is a flow diagram illustrating a method for generating a query to interact with a remote gaming server, according to one embodiment described herein.

FIG. 5 is a flow diagram illustrating a method 500 for generating a query, according to one embodiment. As shown, the method 500 begins at block 502, where a game component 108 identifies an application executing on a mobile device. At block 504, the game component 108 determines conditions (e.g., events within the interactive gameplay) in the application for interacting with a remote gaming server 132. At block 506, the game component 108 determines conditions in the environment for interacting with the remote gaming server 132.

At block 508, the game component 108 determines if one or more of the conditions in the application are satisfied. If not, the game component 108 determines if one or more conditions in the environment are satisfied (block 510). To do so, in one embodiment, the game component 108 can evaluate data from the one or more sensors using defined thresholds for each type of sensor. If the game component 108 determines the data from a given sensor satisfies the threshold for that type of sensor, the game component 108 may proceed to interact with the remote gaming server 132 to determine how to manipulate the interactive gameplay on the application. If conditions in the environment are not satisfied, the game component determines if a defined timing interval for interacting with the remote gaming server has been met (block 512). If not, the method proceeds to block 502.

On the other hand, if the game component 108 determines that conditions in the application are satisfied (block 508), conditions in the environment are satisfied (block 510), or a timing interval is met (block 512), the game component 108 receives data from at least one sensor on the mobile device (block 514). At block 516, the game component 108 determines a current game state and player state for the application. At block 518, the game component 108 generates a query that includes the received information.

Figure 6:
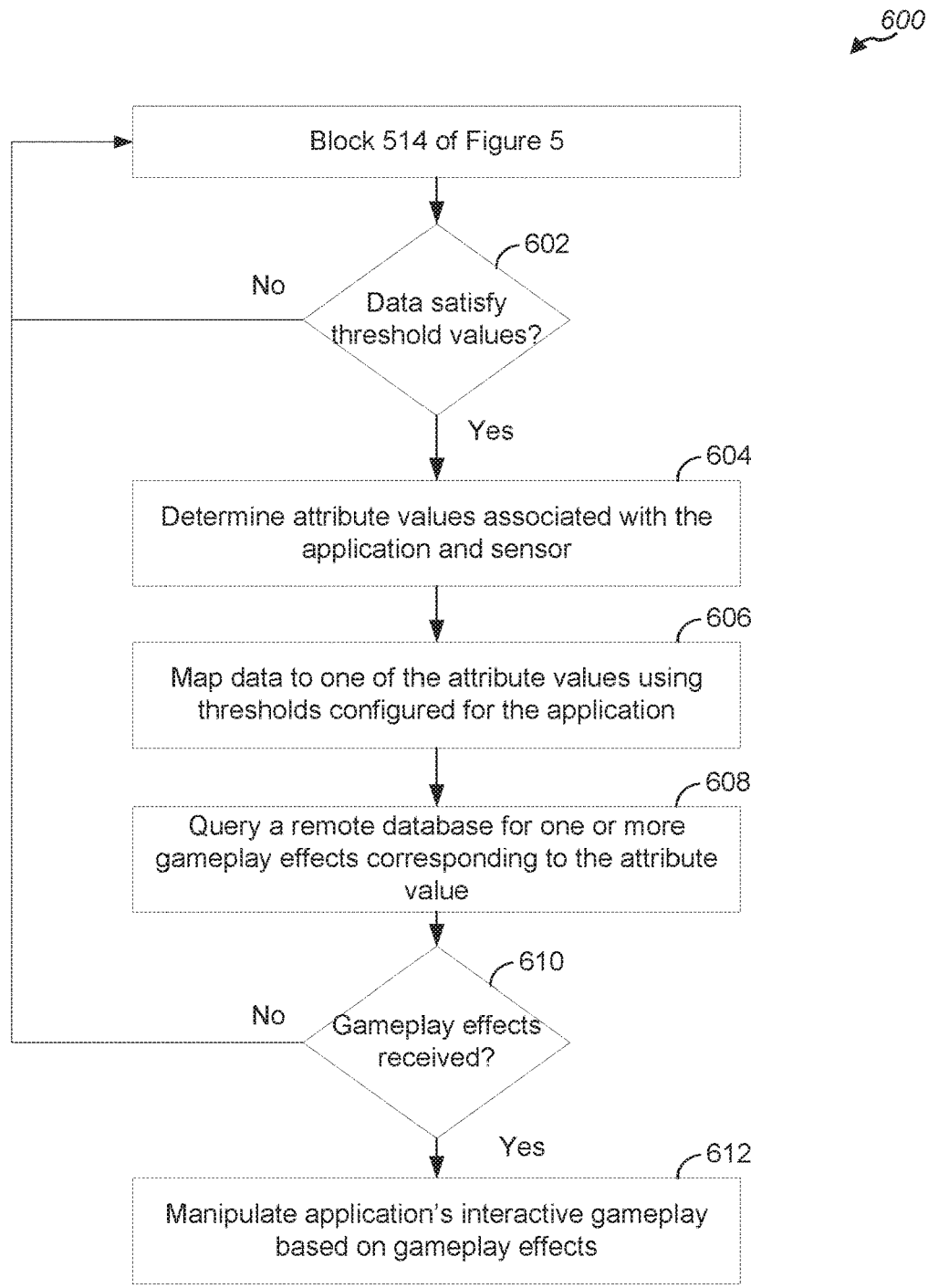
FIG. 6 is a flow diagram illustrating a method for manipulating an interactive gameplay of an application on a mobile device, according to one embodiment described herein.

FIG. 6 is a flow diagram illustrating a method 600 for manipulating an interactive gameplay of an application on a mobile device based on the physical environment, according to one embodiment. Method 600 begins at block 514 of FIG. 5 when the game component receives data from at least one sensor on the mobile device. At block 602, the game component determines if the received data satisfies determined threshold values associated with each sensor on the mobile device. Referring to one reference example above, if the sensor device is a light sensor, the game component 108 may determine if lighting levels detected by the light sensor are above or below a predefined lighting level threshold. Of course, those of ordinary skill in the art will recognize that other types of sensor and/or thresholds may be used. In one embodiment, such threshold values can be configured for each application on the mobile device (e.g., by the remote gaming server).

Once the game component 108 determines that the received data satisfies the threshold values associated with the sensor, the game component 108 determines attribute values associated with the application and sensor (block 604). In one embodiment, such attribute values may be predetermined for each gaming application on the mobile device and configured by a remote gaming server. At block 606, the game component 108 maps the data to one of the attribute values using the thresholds configured for the application. Continuing with the light sensor example, the game component 108 may determine that lighting level above a determined lighting level threshold indicate a "bright" quality of light level. Once mapped, the game component 108 queries a remote database for one or more gameplay effects corresponding to the attribute value (block 608). In the above example, the game component 108 may query a database for one or more in-game lighting conditions that correspond to the "bright" quality of light level.

If the game component 108 receives a response identifying one or more gameplay effects corresponding to the attribute value (block 610), the game component 108 can manipulate the application's interactive gameplay based on the gameplay effects. As noted above, in one embodiment, the game component 108 can modify attributes of the gameplay to match the conditions of the physical environment (detected by the mobile device's sensors). Advantageously, embodiments herein allow a mobile gaming application to manipulate an existing gameplay based on a complex series of inputs from existing sensors on the mobile device. This, in turn, provides a more immersive experience for the user playing the application by connecting the user's in-game experience with the user's out-of-game experience.

Figure 7:
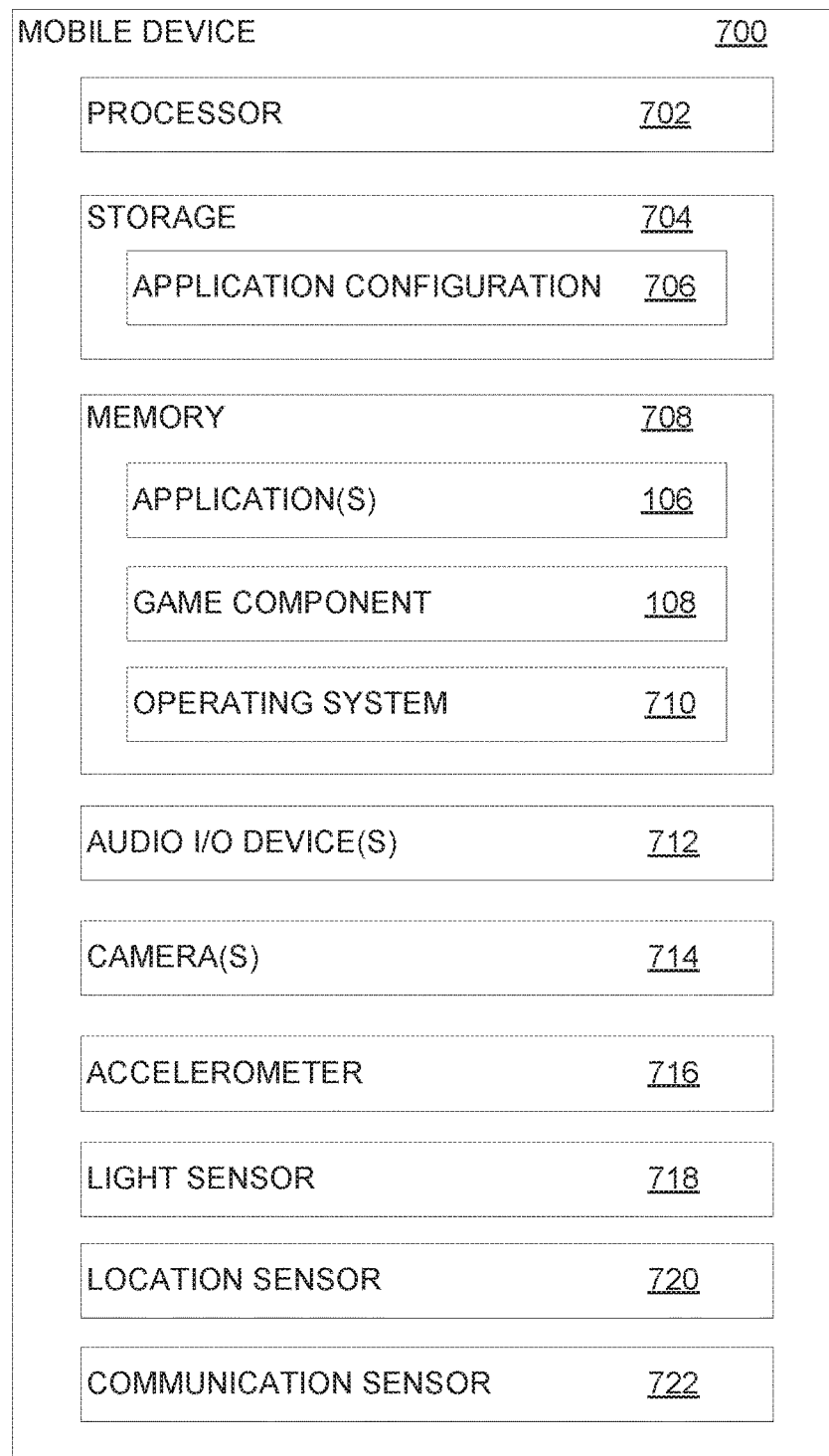
FIG. 7 is a block diagram illustrating a mobile device configured with a game component, according to one embodiment described herein.

FIG. 7 is a block diagram illustrating a mobile device configured with a game component, according to one embodiment described herein. As shown, the mobile device 700 includes a processor 702, storage 704, memory 708, audio I/O device(s) 712 (e.g., one or more microphone, speaker devices, etc.), camera/flash device(s) 714, accelerometer 716, light sensor device 718, location sensor device 720, communication sensor 722 (e.g., a radio frequency (RF) transceiver). Storage 704 includes application configuration data 706.

Generally, the processor 702 retrieves and executes programming instructions stored in the memory 708. Processor 702 is included to be representative of a single CPU, multiple CPUs, a single CPU having multiple processing cores, GPUs having multiple execution paths, and the like. The memory 708 is generally included to be representative of a random access memory. Further, while the depicted embodiment illustrates the components of a mobile device, one of ordinary skill in the art will recognize that the mobile device may use a variety of different hardware architectures. Moreover, it is explicitly contemplated that embodiments may be implemented using any mobile device or system capable of performing the functions described herein.

The memory 708 represents any memory sufficiently large to hold the necessary programs and data structures. Memory 707 could be one or a combination of memory devices, including Random Access Memory, nonvolatile or backup memory (e.g., programmable or Flash memories, read-only memories, etc.). In addition, memory 708 and storage 704 may be considered to include memory physically located elsewhere; for example, on another computer communicatively coupled to the mobile device 700. Illustratively, the memory 708 includes gaming applications 106 and a game component 108. The game component 108 includes a key generator (e.g., key generator 202), query component (e.g., query component 204), and a manipulation component (e.g., manipulation component 206), all of which are discussed in greater detail above. Further, the memory 708 includes an operating system 710. The operating system 710 generally controls the execution of application programs on the mobile device 700. Examples of operating system 710 include, without limitation, UNIX, a version of the Microsoft Windows® operating system, and distributions of the Linux® operating system.

Generally, the mobile device 700 is configured to use its existing sensors to trigger real-time manipulation of a game, application, or other interactive experience in order to better match what is actively happening in a physical environment or on another digital device (e.g., in a film, program, or other non-interactive media).

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, the game component 108 may receive one or more gameplay effects corresponding to data from sensors on the mobile device that satisfies conditions configured for the gaming application. In response, the game component 108 can alter the application's interactive gameplay based on the gameplay effects in order to match what is occurring in the surrounding physical environment. Further, the game component 108 can receive thresholds for each sensor type and predefined attribute values for the application from a remote gaming server hosted in a cloud computing environment. Doing so allows mobile devices to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer program code that, when executed by operation of one or more computer processors, performs an operation comprising:

receiving, from one or more sensor devices of a mobile device during an interactive gameplay of an application on the mobile device, data characteristic of one or more operating conditions of an environment in which the mobile device is located, wherein the one or more sensor devices comprises a microphone sensor and wherein the received data comprises audio effects of an audiovisual film playing on a device in the environment;

upon determining that the data received from the one or more sensor devices satisfies one or more conditions configured on the application for each type of sensor device, determining whether to manipulate the interactive gameplay of the application by:

mapping the data received from the one or more sensor devices to a predefined attribute value associated with the interactive gameplay based on the one or more conditions configured for the application, wherein the predefined attribute value comprises the audiovisual film playing on the device in the environment; and querying a remote database for one or more gameplay effects corresponding to the predefined attribute value; and upon receiving a response identifying at least one gameplay effect associated with the received data, manipulating the interactive gameplay of the application based on the identified at least one gameplay effect, wherein the at least one gameplay effect comprises a list of characters in the audiovisual film currently shown on a display of the device in the environment, and wherein manipulating the interactive gameplay of the application comprises modifying a current game character of the interactive gameplay based on the list of characters in the audiovisual film playing on the device in the environment.

2. The non-transitory computer-readable medium of claim 1, wherein the one or more conditions configured for each type of sensor device comprise predefined threshold values for data collected by each respective sensor device.

3. The non-transitory computer-readable medium of claim 1, wherein modifying the current game character comprises modifying a visual attribute of the current game character in the interactive gameplay.

4. The non-transitory computer-readable medium of claim 3, wherein the visual attribute comprises a costume of the current game character.

5. The non-transitory computer-readable medium of claim 3, wherein the visual attribute comprises a facial feature of the current game character.

6. The non-transitory computer-readable medium of claim 1, wherein modifying the current game character comprises modifying one or more abilities of the current game character in the interactive gameplay.

7. A system, comprising:
a processor; and
a memory containing computer program code that, when executed, performs an operation comprising:
receiving, from one or more sensor devices of a mobile device during an interactive gameplay of an application on the mobile device, data characteristic of one or more operating conditions of an environment in which the mobile device is located, wherein the one or more sensor devices comprises a microphone sensor and wherein the received data comprises audio effects of an audiovisual film playing on a device in the environment;
upon determining that the data received from the one or more sensor devices satisfies one or more conditions configured on the application for each type of sensor device, determining whether to manipulate the interactive gameplay of the application by:
mapping the data received from the one or more sensor devices to a predefined attribute value associated with the interactive gameplay based on the one or more conditions configured for the application, wherein the predefined attribute value comprises the audiovisual film playing on the device in the environment; and
querying a remote database for one or more gameplay effects corresponding to the predefined attribute value; and
upon receiving a response identifying at least one gameplay effect associated with the received data, manipulating the interactive gameplay of the application based on the identified at least one gameplay effect, wherein the at least one gameplay effect comprises a list of characters in the audiovisual film currently shown on a display of the device in the environment, and wherein manipulating the interactive gameplay of the application comprises modifying a current game character of the interactive gameplay based on the list of characters in the audiovisual film playing on the device in the environment.

8. The system of claim 7, wherein the one or more conditions configured for each type of sensor device comprise predefined threshold values for data collected by each respective sensor device.

9. The system of claim 7, wherein modifying the current game character comprises modifying a visual attribute of the current game character in the interactive gameplay.

10. The system of claim 9, wherein the visual attribute comprises a costume of the current game character.

11. The system of claim 9, wherein the visual attribute comprises a facial feature of the current game character.

12. The system of claim 7, wherein modifying the current game character comprises modifying one or more abilities of the current game character in the interactive gameplay.

13. A method, comprising:
receiving, from one or more sensor devices of a mobile device during an interactive gameplay of an application on the mobile device, data characteristic of one or more operating conditions of an environment in which the mobile device is located, wherein the one or more sensor devices comprises a microphone sensor and wherein the received data comprises audio effects of an audiovisual film playing on a device in the environment;
upon determining that the data received from the one or more sensor devices satisfies one or more conditions configured on the application for each type of sensor device, determining whether to manipulate the interactive gameplay of the application by:
mapping the data received from the one or more sensor devices to a predefined attribute value associated with the interactive gameplay based on the one or more conditions configured for the application, wherein the predefined attribute value comprises the audiovisual film playing on the device in the environment; and
querying a remote database for one or more gameplay effects corresponding to the predefined attribute value; and
upon receiving a response identifying at least one gameplay effect associated with the received data, manipulating the interactive gameplay of the application based on the identified at least one gameplay effect, wherein the at least one gameplay effect comprises a list of characters in the audiovisual film currently shown on a display of the device in the environment, and wherein manipulating the interactive gameplay of the application comprises modifying a current game character of the interactive gameplay based on the list of characters in the audiovisual film playing on the device in the environment.

14. The method of claim 13, wherein the one or more conditions configured for each type of sensor device comprise predefined threshold values for data collected by each respective sensor device.

15. The method of claim 13, wherein modifying the current game character comprises modifying a visual attribute of the current game character in the interactive gameplay.

16. The method of claim 15, wherein the visual attribute comprises a costume of the current game character.

17. The method of claim 15, wherein the visual attribute comprises a facial feature of the current game character.

18. The method of claim 13, wherein modifying the current game character comprises modifying one or more abilities of the current game character in the interactive gameplay.

* * * * *